US007263896B2

(12) United States Patent
Bonin

(10) Patent No.: US 7,263,896 B2
(45) Date of Patent: Sep. 4, 2007

(54) PRECISION MULTI-DIMENSIONAL CAPACITIVE TRANSDUCER

(76) Inventor: Wayne Bonin, 21 Black Oak Rd., North Oaks, MN (US) 55127

(*) Notice: Subject to any disclaimer, the term of this patent is extended or adjusted under 35 U.S.C. 154(b) by 0 days.

(21) Appl. No.: 10/996,146

(22) Filed: Nov. 23, 2004

(65) Prior Publication Data
US 2005/0223811 A1 Oct. 13, 2005

Related U.S. Application Data

(62) Division of application No. 09/413,494, filed on Oct. 6, 1999, now Pat. No. 6,820,493.

(51) Int. Cl.
G01B 7/16 (2006.01)
G01L 1/00 (2006.01)
(52) U.S. Cl. ...................................................... 73/781
(58) Field of Classification Search .................. 73/781
See application file for complete search history.

(56) References Cited

U.S. PATENT DOCUMENTS 5,576,483 A * 11/1996 Bonin .......................... 73/105
6,026,677 A *  2/2000 Bonin .......................... 73/105
6,820,493 B1 * 11/2004 Bonin .......................... 73/780

* cited by examiner

Primary Examiner—Michael Cygan
Assistant Examiner—O. Davis
(74) Attorney, Agent, or Firm—Schwegman, Lundberg, Woessner, & Kluth, P.A.

(57) ABSTRACT

A high precision force and displacement measuring device adapted to operate in at least two directions, including signal multiplexing scheme providing multiple signal channels to be transmitted through a single pick-up plate and sense amplifier, while maintaining high isolation between the channels, as well as identical electrical response characteristics of all channels. The device may be used in conjunction with a movable stage (such as on an optical microscope) to perform mechanical measurements on Micro Electro-Mechanical Systems (MEMS) devices.

9 Claims, 7 Drawing Sheets

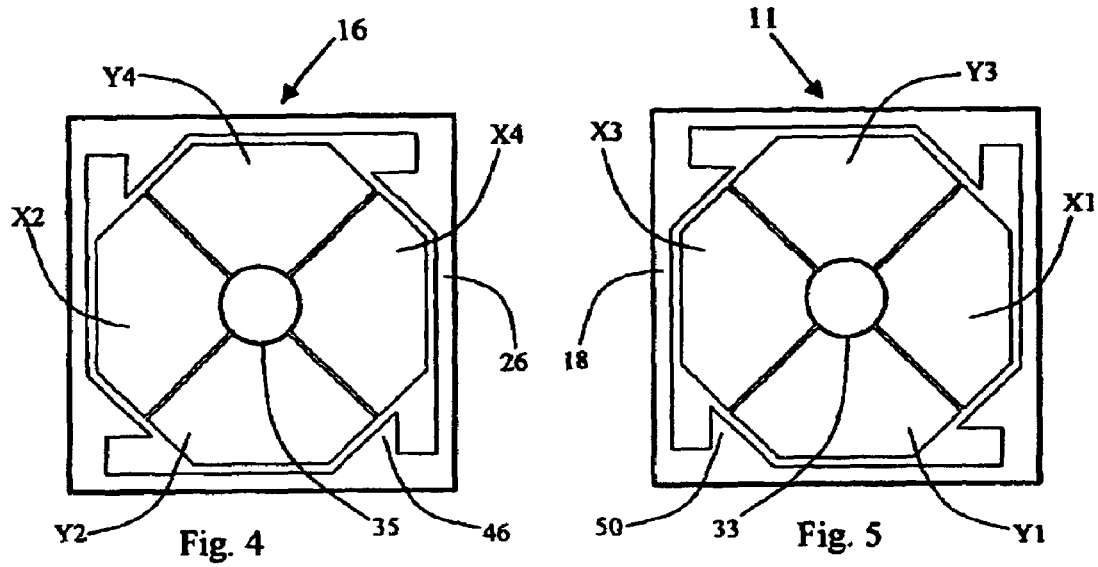
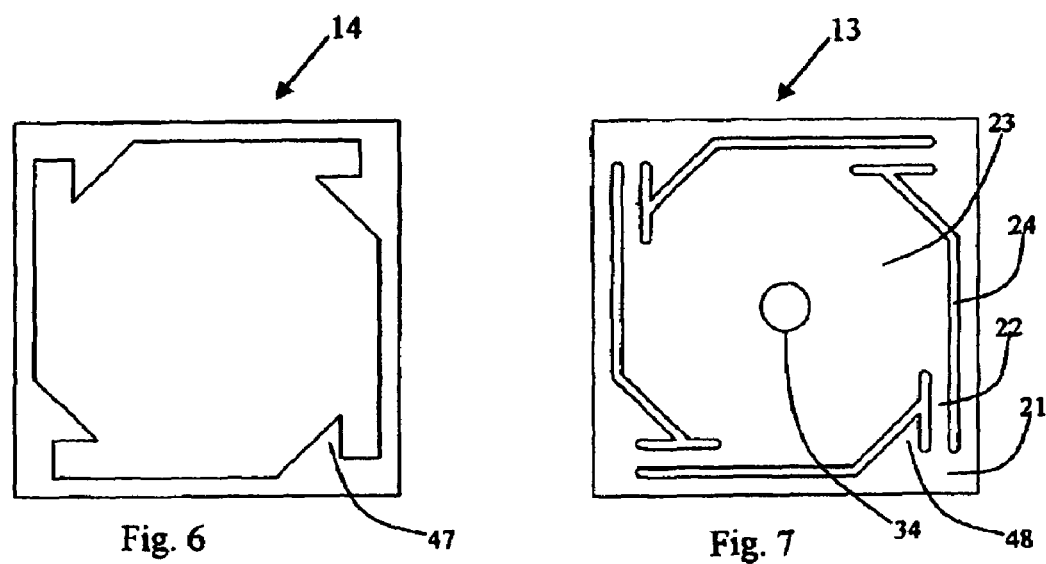

PRECISION MULTI-DIMENSIONAL CAPACITIVE TRANSDUCER

RELATED APPLICATION

This application is a divisional under 37 C.F.R. 1.53(b) of U.S. patent application Ser. No. 09/413,494, filed Oct. 6, 1999, now U.S. Pat. No. 6,820,493, which application is incorporated herein by reference.

BACKGROUND OF THE INVENTION

This invention relates to capacitive transducers, for example for use in displacement and force-responsive devices.

Capacitive displacement transducers are known for use in displacement and force-responsive devices such as measurement probes and joysticks, where a stylus or lever is movable in the directions of two or more orthogonal axes. Normally there would be one or more separate capacitive transducers for each axis of movement, as shown in U.S. Pat. No. 5,661,235. This not only results in a costly, difficult to assemble structure, but also degrades the performance when measuring extremely small forces and displacements, due to the large moving mass which limits the measurement frequency response and increases the sensitivity to external vibrations. Thomas (U.S. Pat. No. 5,006,952) teaches a multiple axis capacitive displacement transducer that uses a single movable pick-up plate. This device does not have the difficult assembly and large moving mass problems as the individual transducer devices have, but it has two other drawbacks, when applied to high precision measurements, that are solved by the present invention. The first drawback is that the pick-up plate is supported, and pivots about a point on the stylus or stem some distance away from the pickup plate. This causes an undesired translational motion in addition to the desired rotational response for x and y axis displacement of the stem. This undesired translational response may generate undesired cross-axis readings. For instance, a pure x-axis displacement of the stem may produce a false Z-axis reading. The other problem is that the signal channels are separated from each other by operating at different frequencies. This results in the individual channels having different noise and frequency response characteristics, which is generally undesirable for precision measurements.

Precision capacitive displacement transducers typically employ three electrodes, which form a structure equivalent to two capacitors connected in series, with the center electrode being movable and common to both capacitors. The center electrode is also typically the pick-up electrode, and the two outer electrodes are mechanically fixed. Although the transducer is fundamentally responsive to displacement of the center electrode, it can be used to measure force, by the deflection of springs of known stiffness in response to that force, as well as acceleration or pressure. Bonin et al. (U.S. Pat. No. 4,694,687) discloses a vehicle performance analyzer which incorporates a capacitive accelerometer based on the three electrode structure described here. By driving the outer electrodes with two equal amplitude signals 180 degrees out of phase, the voltage on the center electrode is a linear function of the displacement from the center, with the phase giving polarity information. The full scale amplitude of the output signal is equal to the amplitude of the drive signal. This is a great improvement over strain gauge type load cells which are also used to measure displacement and force. Strain gauges typically have a full scale output signal that is 0.2% of the input signal, giving the capacitive transducer 500 times greater output signal.

By synchronously demodulating the center electrode signal of the capacitive transducer, a DC voltage proportional to the displacement is generated. In the absence of parasitic effects such as amplifier input capacitance, the output signal of voltage vs. displacement would be perfectly linear, but for conveniently scaled devices, the transducer source capacitance may be on the order of 5 pF and the parasitic capacitance may be 1 pF or more, so the non-linearity is significant, on the order of 20% at full scale in this case. For multiple axis devices sharing a common center electrode, the parasitic capacitance may actually be greater than the sense capacitance per axis. It is possible to eliminate the effect of this parasitic capacitance on the signal linearity by generating a feedback signal that is added to one drive signal and subtracted from the other, in order to maintain a null, or zero voltage situation on the center electrode regardless of displacement. In this case the feedback signal is used as the output signal, and is proportional to the center electrode displacement regardless of parasitic capacitance. Thomas uses this feedback method, and also references British Patent No. GB 1366284.

One application requiring measurement of force and possibly displacement in at least two directions is scratch testing of materials to determine coating adhesion and resistance to wear. In this test, a series of passes at increasing loads are made over the material with a stylus, until reaching a load that causes de-lamination or other catastrophic failure. Typically, both the vertical and horizontal load forces are recorded vs the horizontal position. The vertical displacement of the stylus into the sample may also be recorded. A more sophisticated test uses a ramped vertical load to get the same information from a single, rather than a series of scratches. This measurement requires that there be very little interaction between the signals of the different axes, so that the coefficient of friction, that is the horizontal force divided by the lateral force, can be accurately determined. A similar, more specific application involves tribological studies of materials for rigid disc drive applications, such as measuring the friction properties of various slider materials on a disc surface. In both cases, a low moving mass is desirable to allow a higher measurement bandwidth than is possible with prior art devices such as described in U.S. Pat. No. 5,661,235.

Another application requiring high measurement sensitivity due to the small size of the devices being measured is in the mechanical testing of MEMS devices. These devices are typically 100 to 1000 microns in length, and may have elements with dimensions as small as 1 micron in width or thickness. Due to the very small size of the parts, force sensitivity of one micro newton or better is desired. Multiple axis capability is desired so that measurements can be made in any direction required by the sample, although each measurement is typically made in a single direction.

BRIEF SUMMARY OF THE INVENTION

The present invention provides a force or displacement transducer operative in at least two nominally orthogonal directions in a first embodiment. In a second embodiment, the transducer of the first embodiment is incorporated into an apparatus for measuring mechanical properties of MEMS devices or other small devices, hardness and scratch resistance of thin films and surfaces, and friction and wear properties of small components such as sliders used in the disc drive industry.

The transducer consists of a centrally located pickup plate and several pairs of drive plates on opposing sides of the pickup plate. Preferably there are four pair of drive plates. The drive plates are of a conductive material, which may be copper, fabricated on an insulating substrate for mechanical support using techniques well known in the printed circuit board industry. The center electrode is also formed of a conductive material, but preferably of higher strength than pure copper, such as a high strength Beryllium copper alloy. Support springs for maintaining the proper position of the center electrode are formed integrally with the center electrode by photochemical etching which is a well known process. By arranging the support springs to connect to the center electrode in the same plane as the center electrode, rather than connect to the load stem at some point away from the center electrode, undesired lateral motion of the center electrode which could generate erroneous cross axis signals is eliminated. This also allows for more convenient electrical connection to the moving center electrode, by using the fixed end of one or more of the springs at the electrical contact.

At least one of the outer electrode support substrates contains a central hole through which a stem or probe tip is attached to the center electrode. If this stem is fabricated of an electrically insulating material it may be fastened directly to the center electrode by adhesive, or by a small screw, or any other suitable means. If the stem is fabricated out of a conductive material such as metal, an insulating bushing may be included between the stem and the center electrode to avoid electrical interference being conducted directly to the center electrode. The springs allow the center electrode to deflect in response to forces applied to the probe tip. A force applied directly in line with the probe tip (along the Z-axis) causes the entire center electrode to move closer to the drive plates on one side, and farther away from the drive plates on the other side, while maintaining a parallel relationship between the center electrode and the drive plates. A force applied in a horizontal direction (in the X or Y axis) causes or tilting or rotation of the probe, and the center electrode attached to it.

The position of the center electrode is determined by measuring signals induced on the center electrode by the drive plates. The closer the center electrode is to a drive plate, the more signal it picks up from that drive plate. In that manner a displacement of the drive plate from its normal center position is detected, and the force responsible for that displacement is determined by multiplying the stiffness of the support springs by the measured displacement. The displacement of the portion of the center electrode between each of the four pair of drive plates is determined by applying a pulse to each drive plate pair in sequence, and synchronously measuring the drive plate response signal with the appropriate sense channel, there being one channel for each pair of drive plates. The X, Y and Z axis force components are determined simultaneously by combining the appropriate channels. The Z-axis force is determined by adding all four channels, the Y-axis force is given from the difference between the two Y-axis channels and the X-axis force is determined by the difference between the two X-axis channels.

Determining the relative position of the four channels in this manner, and then combining those signals to get the three axis force information has several advantages over the prior art as disclosed by Thomas. The first advantage is that the electrical frequency response of all three axes are the same, which is desirable for precision measurement instruments, whereas there is a 4:1 difference between the axes in the Thomas method. Also the noise is lower and more consistent between the channels in the current invention, as all channels operate at the same frequency. Whereas, when operating at different frequencies, the channel operating at the lowest frequency will have the greatest noise, since the impedance of a capacitive device is greater at lower frequencies, and greater impedance results in greater noise. Noise is also reduced in the current invention by avoiding the separate Z-axis electrodes, so that for a given transducer size, the active electrode area is greater, which further reduces the impedance. A final benefit of the current invention is that of improved signal linearity. In capacitive transducers as described here and in the prior art, the linearity of the signal is decreased when the electrode plates are not parallel to each other. In both the current invention, and in Thomas, X or Y axis forces cause the center electrode to rotate out of parallel, but the effect on linearity is less severe in the current invention, since the Z-axis ring electrode of Thomas is eliminated. By eliminating the ring, and using only the four quadrant electrodes, the effect of the center electrode tilt is reduced, as the active drive plate covers only about ⅓ of the width of the center electrode, reducing the effect of the tilt on the linearity by the same factor.

The multi-dimensional capacitive transducer has many applications, including use in an instrument for tribological property testing, and also mechanical testing of small structures such as MEMS devices. The tribological property tester consists of mechanism to provide relative motion between two samples being tested, with one of the samples being mounted on the multi-dimensional capacitive transducer. This provides reading of both the normal (Z-axis) load force and the resultant frictional force, so that friction coefficient vs load force, time, speed and other parameters can be readily determined. For testing MEMS devices, the device to be tested is mounted on a moveable stage, which could be a stage on an optical microscope. The multi-dimensional capacitive transducer is mounted above the device to be tested. If the stage just referred to is on an optical microscope, the transducer may be mounted in place of one of the optical objectives. This allows the device to be tested to be optically inspected and positioned, so that when the turret is rotated to engage the multi-dimensional capacitive transducer, the probe stem mounted on the transducer will be in the proper location. The microscope's focusing mechanism is used to provide Z-axis motion, and the microscope stage provides the x-y motion. Due to a lack of commercially available instruments of adequate sensitivity, researchers fabricating and testing MEMS devices often build into the device some sort of structure for performing mechanical testing of the device. Unfortunately, due to the small size of these devices, it is difficult if not impossible to accurately calibrate these test structures. This had led to the publication of some reputed mechanical properties variations that are more likely due to measurement error than any real physical effect. Due to the high sensitivity and low moving mass of this device, it can measure forces down to 1 micro newton or less, yet still be calibrated accurately using conventional methods such as scale calibration weights.

These and various other advantages and features of novelty which characterize the present invention are pointed out with particularity in the claims annexed hereto and forming a part hereof. However, for a better understanding of the invention, its advantages, and the object obtained by its use, reference should be made to the drawings which form a further part hereof, and to the accompanying descriptive matter in which there are illustrated and described preferred embodiments of the present invention.

BRIEF DESCRIPTION OF THE DRAWINGS

In the drawings, in which like reference numerals indicate corresponding parts or elements of preferred embodiments of the present invention throughout the several views:

FIG. 4 is a top view of the lower drive plate electrode assembly;

FIG. 5 is a bottom view of the upper drive plate electrode assembly;

FIG. 6 is a top view of the lower spacer element;

FIG. 7 is a top view of the center electrode assembly;

FIG. 9b is a diagram of the remaining portion of the circuitry used to operate the capacitive transducer, which was not shown in FIG. 9a.

DETAILED DESCRIPTION OF THE INVENTION

Detailed embodiments of the present invention are described herein. However, it is to be understood that the disclosed embodiments are merely exemplary of the present invention which may be embodied in various ways. Therefore, specific details disclosed herein are not to be interpreted as limiting, but rather as a basis for the claims and as a representative basis for teaching one of skill in the art to variously practice the invention.

Figure 1:
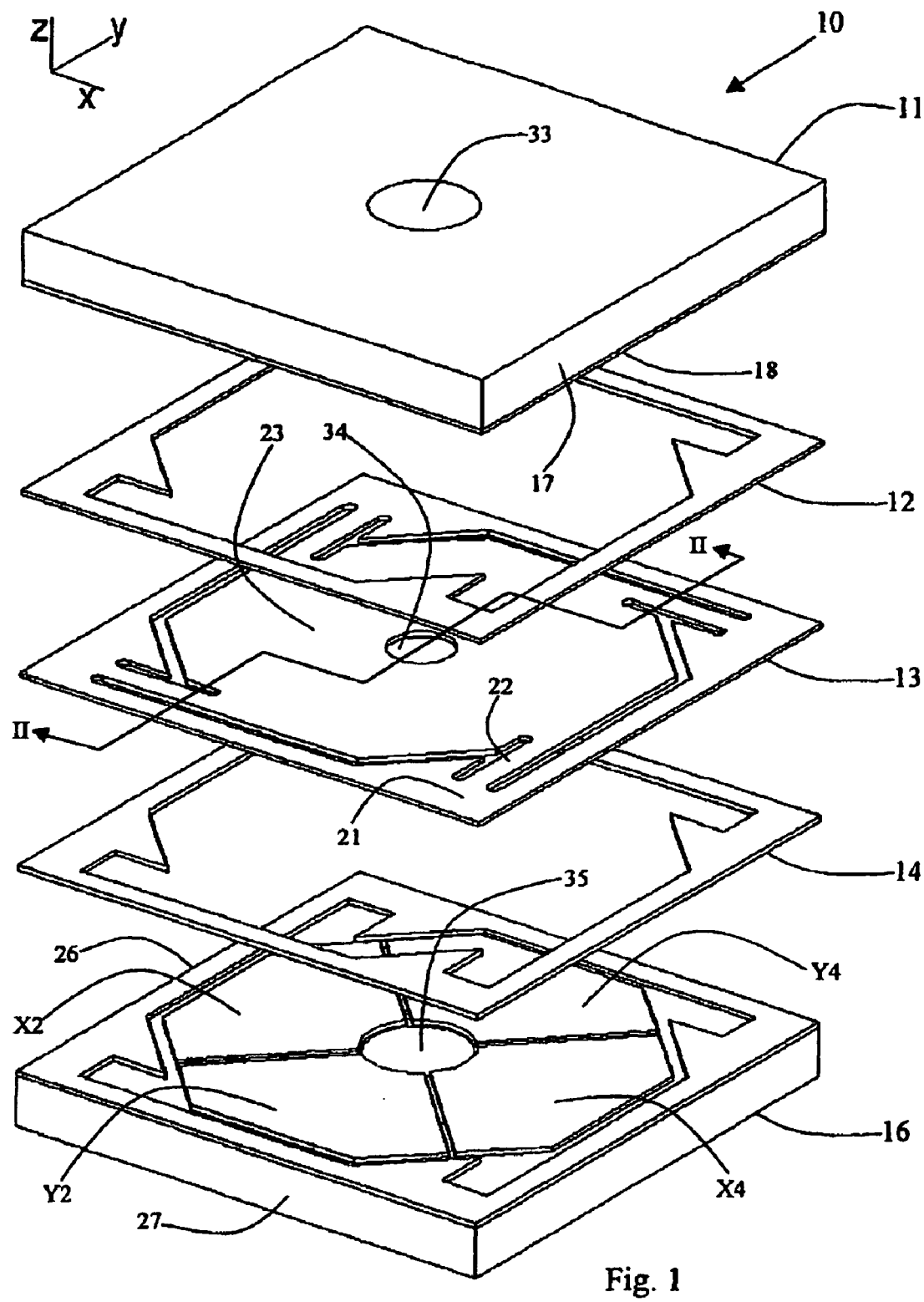
FIG. 1 depicts an exploded view of a capacitive transducer in accordance with the present invention.

Referring now to FIG. 1, an exploded view of the components of the transducer 10 of the present invention, is depicted. These components are also depicted individually in FIGS. 4-7. FIG. 4 is a top view of the lower drive plate electrode assembly 16, showing the four lower drive plates X2, X4, Y2, and Y4, the spacer 26 and the hole 35. FIG. 5 is a bottom view of the upper drive plate electrode assembly 11, showing the four upper drive plates X1, X3, Y1, and Y3, spacer 18, and hole 33. Assembly 11 is a mirrored version of 16. In FIG. 1, the substrates 27 and 17 for lower drive plate assembly 16 and upper drive plate assembly 11, respectively, are also visible. FIG. 6 is a top view of the lower spacer element 14, which is identical to upper spacer element 12. FIG. 7 is a top view of the center electrode assembly 13, consisting of center electrode 23, four identical springs 22, outer spring support frame 21, four identical triangular additional spring support features 48 and center hole 34.

Figure 2:
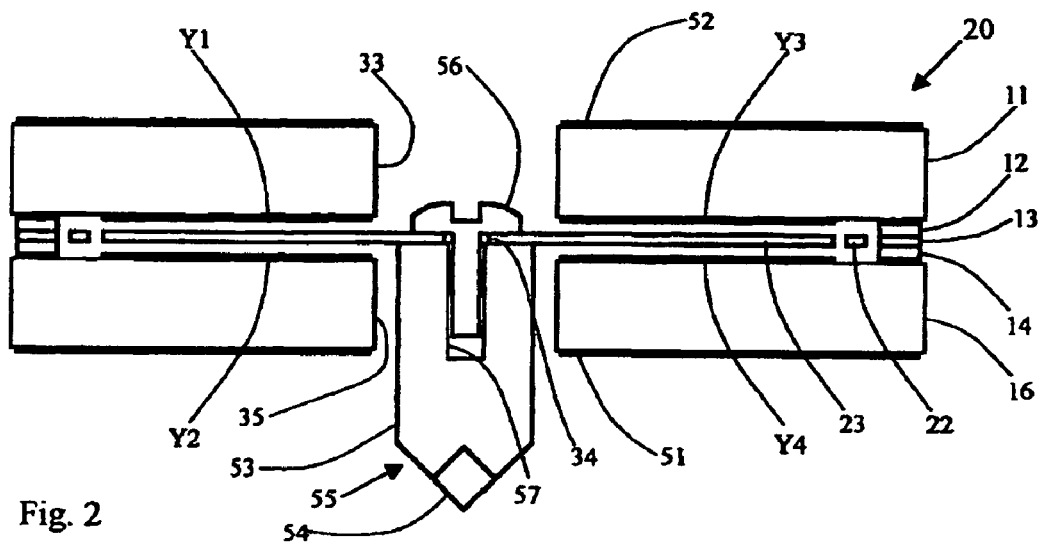
FIG. 2 is a sectional view of the transducer depicted in FIG. 1, including additionally a probe tip for interacting with a sample, viewed through the section indicated by Roman numeral II-II in FIG. 1.

The center electrode assembly 13 is preferably fabricated from a single sheet of metal foil by well known photochemical etching techniques, whereby all of the features are formed simultaneously by chemically removing slots 24 from the sheet. The material used to fabricate center electrode assembly 13 must be reasonably conductive. Any of the metals are more than satisfactory in regard to conductivity. The springs 22 may be rather highly stressed mechanically, so the material is preferably a high strength alloy such as stainless steel or Beryllium copper. The spaces 12 and 14 have no stringent strength requirements, and may be either insulating or conductive. It is convenient to fabricate them out of the same material and using the same process as used for center electrode assembly 13. Drive plate electrode assemblies 11 and 16 are preferably fabricated of standard copper clad printed circuit board material. The substrate is a glass fiber/epoxy composite commonly referred to in the industry as G-10 material. The G-10 material may be purchased with a copper foil of a range of thickness from less than 0.0005 inch to more than 0.005 inch. A commonly stocked copper foil thickness is 0.0014 inch, also referred to as 1 ounce, which is the copper weight per square foot. The material is available with copper on one or both sides. Two sided material, with copper on the outside surface to use as a shield against electrical interference is preferable. FIG. 2 shows a configuration with shields 51 and 52, on the outer surface of the drive plate electrode assemblies 16 and 11. The electrode patterns are formed by standard printed circuit board processing techniques.

If higher cost is permissible in return for better mechanical and thermal stability, the drive plate electrode assemblies 11 and 16 may alternatively be fabricated on an aluminum oxide substrate, using well known hybrid circuit fabrication techniques. In this case, to achieve the desired thermal stability, it is important that the spacers 12, 14 and the center electrode assembly 13 be fabricated of a material with a thermal expansion coefficient similar to the aluminum oxide substrate, such as Molybdenum metal.

The preferred method of assembling transducer assembly 10 is to coat spacers 12, 14 with a thin layer of adhesive such as epoxy, assemble the five main elements as shown in FIG. 1 and hold them together under pressure until the adhesive is cured.

Figure 8:
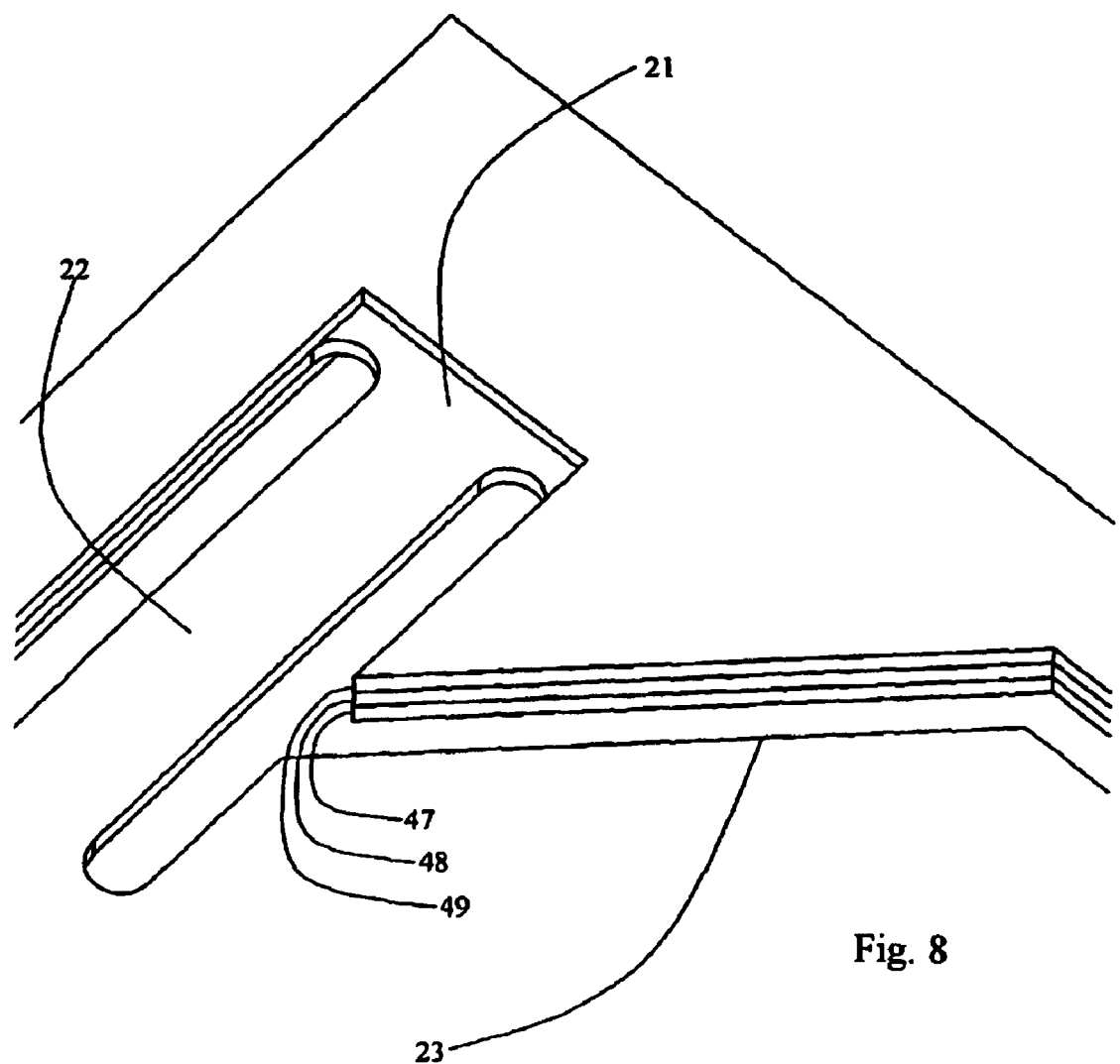
FIG. 8 is a perspective view of one corner of the center electrode assembly and the two spacers, showing the detail of the end support of the spring element.

FIG. 8 is a perspective view of one corner of the center electrode assembly 13 and the two spacers 11 and 16, showing the detail of the end support of spring element 22. The spacers 11, 16 do not cover all of the spring support structure 21, but leave the region at the base of the spring exposed. The purpose of this is to reduce the stress to which the adhesive bond is exposed. The purpose of the additional triangular support regions 48 of the center electrode, 47, 49 of the two spacers and 46, 50 of drive plate assemblies is to increase the area of the adhesive bond to further reduce the stress in the bond line. Minimizing the stress in the adhesive bond line is extremely important in a precision transducer, because polymeric materials, such as epoxies and other adhesives, will begin to deflect and creep excessively at stresses far below those that cause obvious failure. The effect of such behavior on the transducer output is that after a large load is applied to the transducer and then removed, the transducer output signal does not immediately return to zero, but retains some small but undesired offset. Even worse is that the offset is not stable, but gradually disappears over some minutes or hours, so that sensitive measurements made at low loads after a high load measurement will be continuously effected by this changing offset signal. The joint detail shown in FIG. 8 has proven very effective in reducing this effect.

FIG. 2 is a sectional view of the transducer depicted in FIG. 1, viewed through the section indicated by Roman numeral II in FIG. 1. The transducer includes electrical shields 51, 52 as discussed previously, and a probe assembly 55 for interacting with a sample. The probe assembly consists of a probe body 53, probe tip 54 and mounting hole 57. Screw 56 is used to secure the probe to the center electrode plate 23. In this configuration the probe body 53 is directly in contact with the center electrode 23, so the probe body must be a non-conductive material. The probe tip 54 is preferably a precision ground diamond point.

Figure 3:
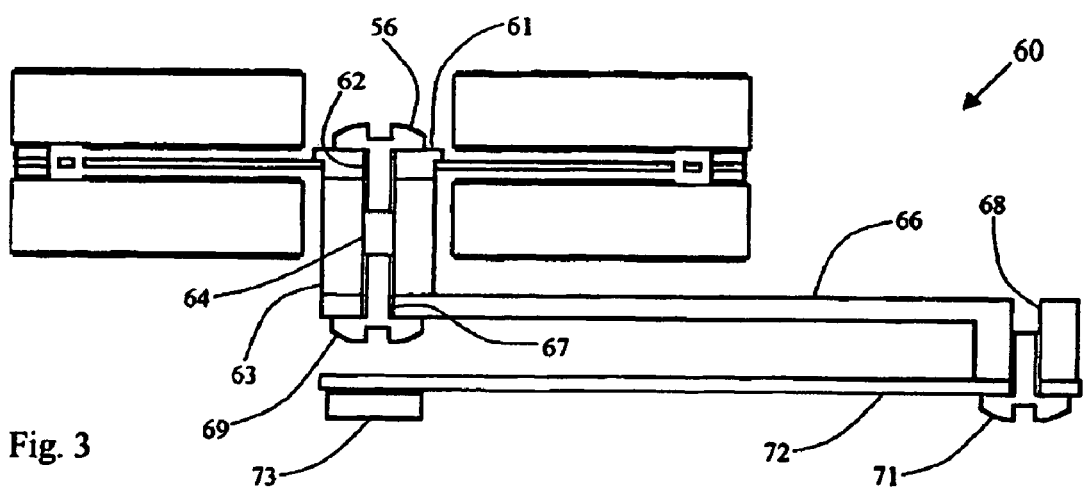
FIG. 3 is a sectional view of essentially the same transducer depicted in FIG. 2, with a load stem and arm assembly designed for mounting a standard rigid disc drive magnetic recording head/slider/suspension assembly for performing friction measurements on said head slider.

FIG. 3 is a sectional view of essentially the same transducer depicted in FIG. 2, with a load stem and arm assembly designed for mounting a standard rigid disc drive magnetic recording head/slider/suspension assembly for performing friction measurements on the head slider. In this illustration, insulating probe body 53 is replaced by a metal load stem 63. Electrical isolation between the load stem 63 and the center electrode 23 is provided by insulating bushing 61, which extends through the hole 34 in the center electrode, and is glued to it. Screw 56 extends through hole 62 in bushing 61 and engages threads in hole 64 in load stem 63 to secure load stem to center electrode 23. Mounting bar 66 is secured to load stem 63 by screw 69 passing through hole 67 and engaging threads in hole 64. The head slider 73 to be tested is mounted on a standard suspension 72, the features of which are well known in the magnetic recording industry. The length of mounting bar 63 corresponds with the length of suspension 72, so that slider 73 being tested is directly under the center of center electrode 23. If suspension 72 were attached directly to load stem 63, the vertical load force would interact with the length of the suspension to generate a bending moment, which would erroneously be detected by the transducer as a frictional force. It is important for testing the friction and wear characteristics of magnetic recording sliders to maintain the proper alignment of the slider with the surface against which it is being tested. This is achieved here by the mounting bar 66 which allows the actual slider suspension 72 to be used for the friction testing. The suspension 72 includes a gimbal mechanism (not shown) which the slider is attached to, which allows the slider to pivot freely to orient itself to the test surface. If the slider were mounted directly on the transducer load stem 63, it would not be oriented properly to the surface, rather the contact would invariably be concentrated at one of the corners, or one edge at best, so the test results would be invalid as they would not represent the actual operating stresses, and furthermore the stresses between tests would not be consistent as the contact geometry would vary from test to test.

Referring to FIGS. 1-7 as required, the operation of the transducer will now be explained. Although the actual circuitry used in this invention adjusts the drive plate voltages to maintain zero output voltage on the center electrode, for simplicity, consider for now the case with a fixed, equal AC voltage on all drive plates, but with the phase between the upper and lower drive plates being 180 degrees different. Without an applied load to the end of probe assembly 55, the springs 22 are undeflected and the center electrode 23 is equidistant between the lower drive plates X2, X4, Y2, Y4 and the upper drive plates X1, X3, Y1, Y3. This represents a null condition, with no signal being present on the center electrode 23. Now consider a load force applied to the probe 55 in the vertical, Z-axis direction. Springs 22 will bend equally, and center electrode 23 will deflect upwards toward the upper drive plates and away from the lower drive plates. The center electrode will then pick up more signal from the upper drive plates since it is closer to them, and less from the lower drive plates, resulting in AC signals on the center electrode proportional to the amount of displacement, and with a phase dependent on the direction of the displacement. If the drive plate voltages were constant the linear output signal would result from using a high input impedance buffer rather than charge amplifier 91 to amplify the signal generated on center electrode 23. Either way, the buffered and/or amplified AC signal at the output of amplifier 91 synchronously demodulated and multiplexed to separate the signals into four separate differential channels by eight channel analog multiplexer 96. These signals are stored on sampling capacitors 97, 98 for channel 1, 101, 102 for channel 2, 106, 107 for channel 3, and 111, 112 for channel 4. The differential signals stored on the capacitors are converted to the four ground referenced signals CH1, CH2, CH3, CH4 by differential amplifiers 99, 103, 108, 113 respectively.

The drive plate signals applied to transducer 10 are generated by the three triple 2-channel analog multiplexers 86, 87, 88, which act as three single pole double throw switches. The switches are independently controlled by select inputs A, B, C, so that COM I/O A is connected to SELECTED I/O A0 when SELECT input A is low, and COM I/O A is connected to SELECTED I/O A1 when SELECT input A is high. COM I/O B and C are respectively connected to SELECTED I/O B0/B1 and C0/C1 depending on the logic level of SELECT inputs B and C, in a like manner. Device 86 is actually identical to 87 and 88, but section C is not shown as it is not used. When the SELECT signal is low, both drive plates X1, X2 are connected to CH1 by analog multiplexer 86. When the SELECT signal is high, drive plate X1 is connected to −5V and drive plate X2 is connected to +5V. In a similar manner, drive plates Y1, X3, Y3 are controlled respectively by SELECT signals A, B, C to multiplexer 87, so that when the SELECT signals are low, the drive plates are connected to CH2, CH3, CH4 respectively, and to −5V when the select signals are high. The remaining drive plates are powered by multiplexer 88. Again, when the SELECT signals A, B, C are low, the respective drive plates Y2, X4, Y4 are connected to CH2, CH3, CH4 respectively. When the respective select inputs are high, the respective drive plates Y2, X4, Y4 are connected to +5V.

Figure 10:
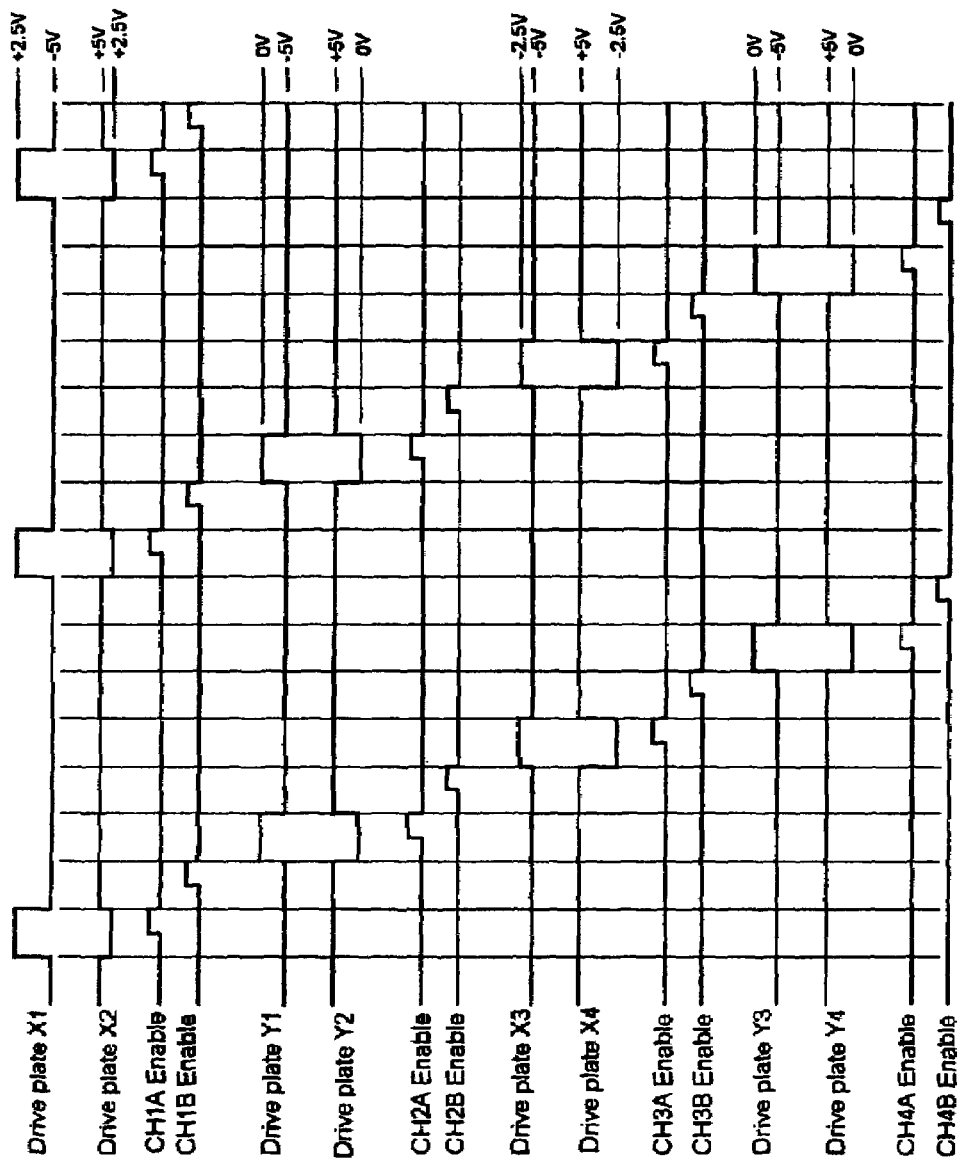
FIG. 10 is a timing diagram to aid in the understanding of the circuit operation.

The analog multiplexers 86, 87, 88 are controlled by signals from 3-line to 8-line decoder 82, which is in turn driven by signals from binary counter 81, which is driven by oscillator 76. Oscillator 76 consists of Schmitt inverter 77, timing capacitor 78 and timing resistor 79. The speed of oscillator 76 is on the order of 0.5/((capacitor 78) (resistor 79). Binary counter 81 and decoder 82 provide a train of pulses at the outputs of decoder 82 at a frequency that is divided by a factor of 16 from the oscillator 76 frequency. Schmitt inverter 77 may be an industry standard 74HC14. The operating frequency is determined by the values of capacitor 78 and resistor 79 and is not critical. Resistor 79 may have a resistance of 10,000 Ohms and capacitor 78 may have a capacitance of 68 pF for and oscillator 76 frequency of 735,000 Hz, but the circuit can operate properly over a wide range of frequency. As binary counter 81 goes through its repetitive sequence of binary counts: 0000, 0001,0010, 0011,0100,0101,0110,0111,1000,1001,1010, 1011, 1100, 1101, 1110, 1111, 0000 and so forth, the eight outputs Y0 through Y7 of the decoder 82 are sequentially pulled low from their normally high state. Only one output at a time is low, and each output is low for an equal time, which is ⅛ or 12.5%. Note that only four of the eight outputs are used to control the multiplexers 86, 87, 88 that control the drive plates. Each of these four used outputs from decoder 82 controls a pair of drive plates. The first output, Y0, controls drive plate pair X1, X2. The second used output Y2 controls drive plate pair Y1, Y2. The third used output Y4 of 82 controls the drive plate pair X3, X4. The fourth used output of 82, Y6, controls drive plate pair Y3, Y4. The timing diagram, FIG. 10, shows the sequencing of these drive plate signals graphically versus time. The voltage levels of the pulses to drive plates X1, X2, X3, X4 assume a certain deflection of the load stem in the X-axis, with the circuit operating in a feedback mode that will be explained later.

Eight channel analog multiplexer 96 is controlled by the same binary count sequence generated by counter 81 as is decoder 82. The least significant bit of counter 81 is connected to the disable input of multiplexer 96 to reduce the duration of the sample time to half of the drive plate pulse time. Inverter 83 is used to set the correct phase, so that the first sample period for a given drive plate pair is during the last half of that drive plate pulse, to avoid transient signals due to the switching at the beginning of the pulse. The transients generated at the end of the pulse are likewise avoided by the second sampling period being delayed in the same manner. This sample window for multiplexer 96 is shown in FIG. 10, and is labeled CH1A Enable, CH1B Enable, through CH4A Enable, CH4B Enable. Note that the channel enable signals are not accessible, but are generated internally to multiplexer 96 and are shown to help in understanding the operation of the circuit.

It should now be possible to understand how the separate channel information is obtained from the single pickup plate e.g., electrode 23 and four pair of drive plates. Referring to FIG. 10, but assuming no feedback to the drive plates, with the upper drive plates X1, Y1, X3, Y3 being pulsed from −5V to zero and the lower drive plates X2, Y2, X4, Y4 being pulsed from +5V to zero, it can be understood that no net charge is transferred from the active pair of drive plates when the drive plate to center electrode spacing and hence capacitance is equal, as the charge transferred by one plate is removed by the other. If the plate spacing is not the same, more charge will be transferred from the closer drive plate, causing a voltage at the charge amplifier 92 output. This voltage is amplified at the proper time sequence so as to be stored on the sample capacitor of the correct channel as described earlier. The differential measurement of the voltage for each channel using one sample during drive plate pulse, and a second sample after the pulse but before the next channel's pulse rejects electrical disturbances between channels, for very low cross axis coupling.

A force in the X-axis direction applied to the end of probe 55 will cause a rotation of the center electrode to occur, so that the center electrode is closer to lower drive plate X2 and upper drive plate X3, and conversely farther away from lower drive plate X4 and upper drive plate X1. This results in a negative voltage being stored on sample capacitor 97 as a result of the CH1A sample, due to the closer proximity of the center electrode to drive plate X2 with the negative going leading edge pulse, and a positive voltage being stored on sample capacitor 98, due to the positive going trailing edge of the pulse applied to the closer drive plate X2 which determines to charge amplifier 91 output voltage for the CH1B sample. This results in a negative voltage at the output of differential amplifier 99 for a positive X axis force. As the center electrode deflection at the X3, X4 drive plate pair is in the opposite direction, the polarities are reversed and the voltage at the output of differential amplifier 108 will be positive for a positive X axis force. The operation for an applied Y axis force is the same, except that the relevant drive plates are now pairs Y1, Y2 and Y3, Y4. The corresponding differential amplifiers are 103 and 113.

Figure 9A:
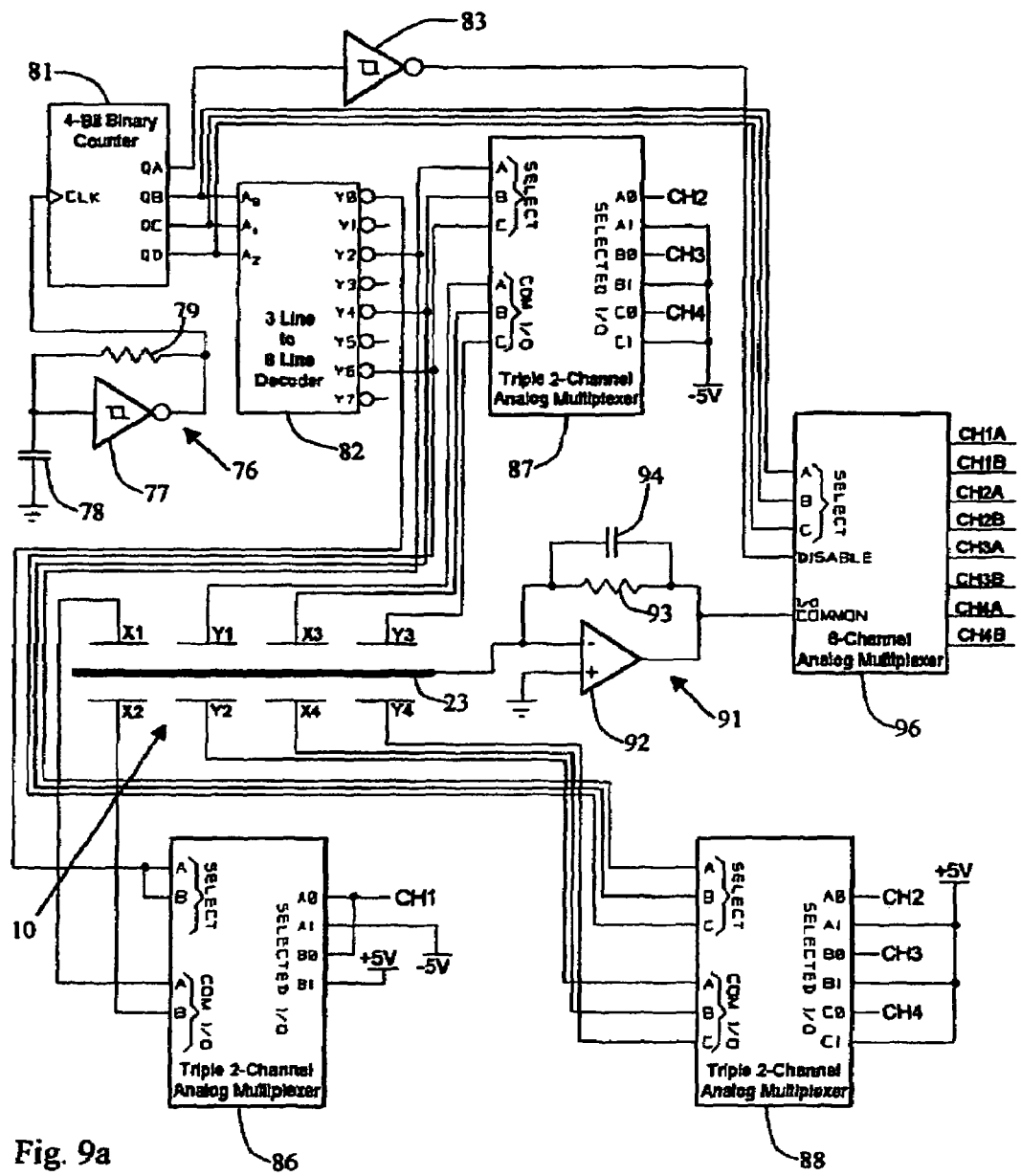
FIG. 9a is a diagram of a portion of the circuitry used to operate the capacitive transducer.

The operation of the drive plate feedback signal adjusts the drive plate voltages to keep the center electrode voltage at zero. An X axis force causes a negative voltage at differential amplifier 99 and a positive voltage at differential amplifier 108. These voltages are integrated by the inverting integrators 116, 126, so that as long as the negative voltage at present at the output of amplifier 99 the output of integrator 116 will go increasingly positive, and the positive output of amplifier 108 will cause the output of inverting integrator 126 to go increasingly negative. The outputs of these integrators are the CH1 and CH3 signals, and are also the feedback signals fed back to the indicated inputs of the multiplexers 86, 87, 88 shown in FIG. 9a. At FIG. 10, it is seen that the drive plate X1 pulse goes from −5V to +2.5V (rather than to zero), so that pulse amplitude has been increased by the feedback, while the X2 pulse goes from +5V to +2.5V (rather than zero), so that pulse amplitude has been decreased. The result of this feedback to the drive plates X1 and X2 is to force the voltages at amplifier outputs 99, 108 back to zero, at which point the output voltage of the integrators 116 and 126 stop changing and hold the values required for zero signal at the center electrode. Any change in the applied force is quickly adjusted for by the integrators to provide the new required CH1, CH3 voltages for a null output from the center electrode. For a Y axis applied force the operation is the same, with the action now occurring on amplifier 103, 113 and integrator 121, 131.

The integrator for CH1 consists of resistor 117 and capacitor 118 which set the integration time constant, and operational amplifier 119. The CH2 integrator consists of resistor 122, capacitor 123, and operational amplifier 124. The CH3 integrator consists of resistor 127, capacitor 128, and operational amplifier 129. The CH4 integrator consists of resistor 131, capacitor 132, and operational amplifier 133. Resistors 117, 122, 127, 131 may be 10,000 Ohm. Capacitors 118, 123, 128, 132 may be 680 pF. Different circuit operating frequencies may require adjustment of the capacitor or resistor values in the integrators. The operational amplifier type is not critical. It may be a National Semiconductor LF347.

Figure 9B:
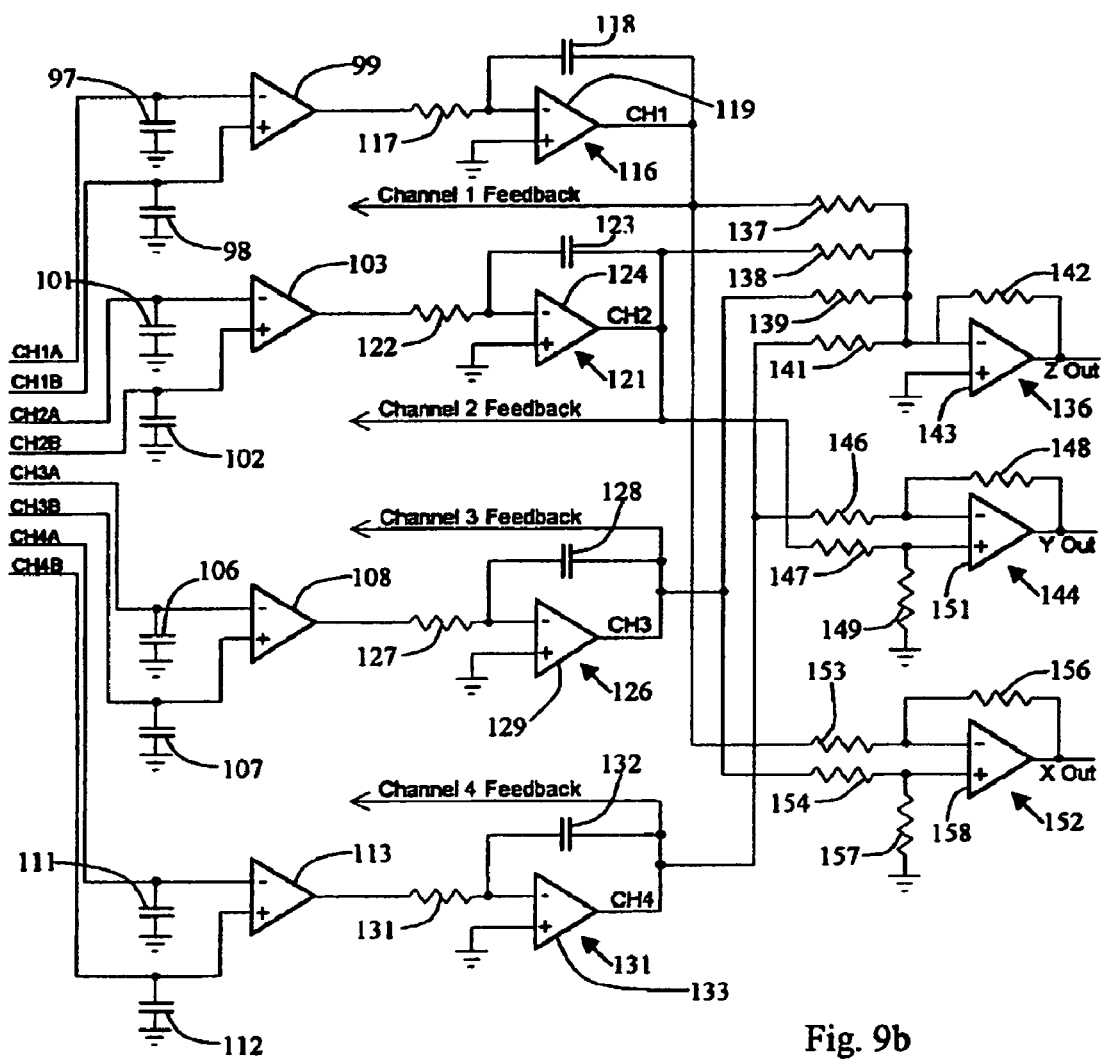

Referring to FIG. 9b, the Z axis signal is determined by summing all four channels CH1-CH4 using adder circuit 136, consisting of summing resistors 137, 138, 139, 141, feedback resistor 142 and operational amplifier 143. The values of the resistors may all be 10,000 Ohm, and the operational amplifier may again be an LF347. The X axis signal is determined by taking the difference between the signals of CH1 and CH3, using difference amplifier 144, consisting of resistors 146, 147, 148, 149 and operational amplifier 151. Similarly, the Y axis signal is determined by the difference between CH2 and CH4, using difference amplifier 152 consisting of resistors 153, 154, 156, 157 and operational amplifier 158. The resistors may also be 10,000 Ohms and these operational amplifiers may also be of type LF347.

The binary counter 81 may be an industry standard 74HC161, and the decoder 82 maybe a 74HC138. The multiplexers 86, 87, 88 maybe of type 74HC4053 and the eight channel multiplexer 96 may be a type 74HC4051. Amplifier 92 must be of high enough speed for the operating clock frequency of oscillator 76, and should generally be a precision, low noise high speed device. An LT1363 from Linear Technology Corporation is a good choice. The value of resistor 93 must supply the required DC bias current to the negative input terminal of amplifier 92, without discharging capacitor 94 significantly during the duration of one drive plate pair pulse. A value of 1,000,000 Ohms is suitable. Charge integration capacitor 94 should be on the same order as the transducer capacitance. A value of 22 pF was found to work satisfactorily with a transducer of overall size one inch square and plate spacing of 0.006 inch. The value of the sample capacitors 97, 98, 101, 102, 106, 107, 111, 112 are not critical and can be on the order of 0.01 μF. The differential amplifiers 99, 103, 108, 113 may be single integrated devices as shown in FIG. 9b, or they may be constructed from operational amplifiers and resistors using one of several possible configurations which are familiar to those skilled in the art of analog electronic circuitry.

The electrical connections from the circuitry to the transducer drive plates and center electrode have not been shown in the transducer figures as there are a number of different possibilities for doing so that are well known to those skilled in the electronics circuit field, and to avoid unnecessarily complicating the figures. The preferred method of making the connections is to use industry standard plated through vias to connect the drive plates on the inside of the transducer to etched metal lines on the outside, which are routed to a connector on one edge of the transducer.

For certain applications the slight tilting of load stem 53 under the influence of X or Y axis forces is objectionable. For these applications the tilting can be eliminated by replacing the illustrated spring configuration with a more complicated three dimensional network of beams that prevents tilting but allows motion of the center electrode in the X, Y and Z axes. The single center electrode plate 23 is modified to either a cube, which is preferably hollow to provide reduced mass, or three interleaved flat metal plates, with each one oriented in a different axis. Since the more complicated spring structure allows motion only in the desired X, Y and Z axes, one pair of drive plates is eliminated, and each of the remaining three pair are associated directly with one axis only, so the X, Y, Z output signals are taken directly from integrators 116, 121 and 126. Except for the elimination of one of the four channels and the sum and difference amplifiers 136, 144, 152, the circuitry is the same as described for the first embodiment.

Another embodiment of this invention is a micromechanical or MEMS testing instrument consisting of a precision multi-dimensional capacitive transducer mounted on an optical microscope in place of one of the optical objectives. The sample to be tested is placed on the stage of the microscope, which preferably is motorized to provide X and Y axis positioning of the sample under computer control. The sample is first inspected with the optical microscope, the location to be mechanically tested is determined and positioned at the proper location, the objective turret is rotated to engage the capacitive transducer and the mechanical test is performed. If the test involves applying a force in the Z axis the loading is obtained by moving the sample toward the transducer in the Z axis using the focus control of the microscope. If the required test force is in the X or Y axis the loading is obtained by motion of the microscope stage.

Specific details, characteristics, advantages and applications of the invention covered by this document have been set forth in the foregoing description. It will be understood, however, that this disclosure is, in many ways, only illustrative. Changes may be made in details, particularly in matters of shape, size, arrangement of parts and values of electronic components, without exceeding the scope of the invention. The scope of the invention is, of course, defined in the language in which the appended claims are expressed.

What is claimed is:

1. A precision multi-dimensional capacitive transducer comprising:
   at least one drive plate electrode assembly, said assembly including a plurality of drive plates, said drive plates being composed of electrically conductive material, said assembly also including insulating substrate means holding said drive plates of said assembly fixed with respect to each other;
   spacer means disposed on said at least one drive plate assembly;
   pickup electrode means operatively engaging said at least one drive plate electrode assembly; and
   at least one support spring, said spring including a main central section and two ends, a first end proximate to and mechanically engaging and supporting said pickup electrode, remaining end engaged and supported by said spacer means, said remaining end being wider than said main central section, said remaining end section proximate said spacer means extending at least ¼ of the width of said main section, before contacting said spacer means.

2. The transducer of claim 1 wherein said spacer means and ends proximate said spacer means of said at least one support spring, includes additional support means.

3. A precision multi-dimension capacitive transducer comprising:
   pickup electrode means containing six faces, said faces operatively grouped into three pairs, the two faces within each pair being parallel with each other and the faces of each pair being orthogonal with each of the faces of the other two pair, all of said faces connected electrically and mechanically together and composed of an electrically conductive material, said pickup electrode means being centrally located within the transducer;
   six drive plates, one drive plate facing one of each face of said pickup electrode means, means for supporting said drive plates, each of said drive plates being composed of an electrically conductive material;
   a plurality of support springs engaging and supporting said pickup electrode means, said support springs arranged in a three dimensional network effective to restrict motion of said pickup electrode means to the three orthogonal axes normal to the faces of said pickup electrode means.

4. The capacitive transducer of claim 3, further including: electrical circuit means for applying electrical drive pulses to said drive plates, said pulses having a frequency F, and pulse width T of approximately $1/(6*F)$, said drive pulses being grouped into three main channels, one per operative drive plate pair, there being a total of three drive plate pairs, each of said pair physically positioned on opposite faces of said pickup electrode means, each main channel consisting of two sub-channel pulses, one sub-channel pulse of said main channel operative on one drive plate of said drive plate pair, with remaining sub-channel pulse of said main channel simultaneously operative on remaining drive plate of said operative drive plate pair, with said main channels being multiplexed to sequentially apply said pulses to said drive plates with each main channel dedicated to a particular operative drive plate pair and with said main channels being spaced apart in time by approximately the pulse width T;
   sampling means for synchronously demodulating and demultiplexing the signal on the pickup electrode means into three channels, each channel consisting of two sub-channel signals, each channel operatively associated with a particular operative drive plate pair;
   timing means for controlling said sampling means such that each first sub-channel is sampled during the time period that the drive pulse is applied to the corresponding drive plate and each second sub-channel is sampled after the drive pulse corresponding to that drive plate has ended, and before the drive pulse corresponding to the next channel in said multiplexed sequence is applied;

storage means for each sub-channel; and differential amplifier means to convert each of the three sub-channel signal pairs into single main channel signals.

5. The capacitive transducer of claim 4, wherein each of said main channel signals generated by said differential amplifier means constitutes the outputs of the transducer.

6. The capacitive transducer of claim 4, wherein each of said main channel signals generated by said differential amplifier means are connected to feedback circuit means which produce feedback signals which control the amplitude of the drive plate pulses in response to displacement of the pickup electrode means, such that the induced voltage on the pickup electrode means is forced to zero, and the feedback signals generated by said feedback circuit means are proportional to the displacement of the pickup electrode means.

7. The capacitive transducer of claim 6, wherein said feedback signals constitute the outputs of the transducer.

8. The transducer of claim 3 wherein said pickup electrode means further comprises a hollow box shaped structure.

9. The transducer of claim 3 wherein said pickup electrode means further comprises three interleaved flat plates.

* * * * *